United States Patent
Nakatani

(10) Patent No.: US 11,625,348 B2
(45) Date of Patent: Apr. 11, 2023

(54) TRANSFER DEVICE, INFORMATION PROCESSING DEVICE, AND DATA TRANSFER METHOD

(71) Applicant: OMRON Corporation, Kyoto (JP)

(72) Inventor: Yoshihiro Nakatani, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/605,227

(22) PCT Filed: Mar. 3, 2020

(86) PCT No.: PCT/JP2020/008813
§ 371 (c)(1),
(2) Date: Oct. 20, 2021

(87) PCT Pub. No.: WO2020/235174
PCT Pub. Date: Nov. 26, 2020

(65) Prior Publication Data
US 2022/0179813 A1    Jun. 9, 2022

(30) Foreign Application Priority Data

May 17, 2019  (JP) .............................. JP2019-094031

(51) Int. Cl.
*G06F 13/28*   (2006.01)
*G06F 13/42*   (2006.01)
*G06F 13/32*   (2006.01)

(52) U.S. Cl.
CPC .............. *G06F 13/28* (2013.01); *G06F 13/32* (2013.01); *G06F 13/4221* (2013.01); *G06F 2213/0026* (2013.01); *G06F 2213/28* (2013.01)

(58) Field of Classification Search
CPC ................. G06F 13/28; G06F 13/4221; G06F 2213/0026; G06F 2213/28; G06F 13/32
See application file for complete search history.

(56) References Cited

U.S. PATENT DOCUMENTS

2008/0104341 A1*  5/2008  Ihara ........................ G06F 13/28
                                                             711/E12.001
2012/0166699 A1    6/2012  Kumar et al.
(Continued)

FOREIGN PATENT DOCUMENTS

JP    H06274436      9/1994
JP    2013065079     4/2013
(Continued)

OTHER PUBLICATIONS

Machine translation of JP2016224560A corresponding to PCT document D1. (Year: 2016).*
(Continued)

*Primary Examiner* — Glenn A. Auve
(74) *Attorney, Agent, or Firm* — JCIPRNET

(57) ABSTRACT

A transfer device (230) for communicating with a first processing device (110 or 210) and a second processing device (210 or 110) by PCIe is provided. The transfer device (230) is provided with a direct memory access controller (DMAC) (233) for controlling a data transfer from a first memory (120 or 220) of the first processing device to a second memory (220 or 120) of the second processing device; a first transmission descriptor controller (235 or 237) for acquiring, from the first processing device, information relating to a first memory address in the first memory at which the data to be transferred is stored; and a first reception descriptor controller (234 or 236) for acquiring, from the second processing device, information relating to a second memory address in the second memory at which the data to be transferred should be stored.

8 Claims, 4 Drawing Sheets

(56) References Cited

U.S. PATENT DOCUMENTS

2015/0120983 A1* 4/2015 Okuda .................... G06F 13/30
710/308
2015/0143031 A1* 5/2015 Lu ....................... G06F 12/0246
711/103

FOREIGN PATENT DOCUMENTS

JP       2014106940       6/2014
JP       2016224560       12/2016
WO    WO-2016127552 A1 * 8/2016   ............. G06F 13/28

OTHER PUBLICATIONS

Machine translation of JP 3176472 B2 corresponding to PCT document D2. (Year: 2001).*
Machine translation of WO 2016127552 A1 (Year: 2016).*
"International Search Report (Form PCT/ISA/210) of PCT/JP2020/008813," dated Jun. 16, 2020, with English translation thereof, pp. 1-4.
"Written Opinion of the International Searching Authority (Form PCT/ISA/237) of PCT/JP2020/008813," dated Jun. 16, 2020, with English translation thereof, pp. 1-8.

* cited by examiner

TRANSFER DEVICE, INFORMATION PROCESSING DEVICE, AND DATA TRANSFER METHOD

CROSS-REFERENCE TO RELATED APPLICATION

This application is a 371 application of the International PCT application serial no. PCT/JP2020/008813, filed on Mar. 3, 2020, which claims the priority benefits of Japan Patent Application No. 2019-094031, filed on May 17, 2019. The entirety of each of the above-mentioned patent applications is hereby incorporated by reference herein and made a part of this specification.

TECHNICAL FIELD

The present invention relates to a transfer device, an information processing device, and a data transfer method.

BACKGROUND ART

Patent Literature 1 discloses controller modules 20 which each include a processor 22 and a data transfer controller 30 and are connected to be able to communicate by peripheral component interconnect express (PCIe).

CITATION LIST

Patent Literature

Patent Literature 1
Japanese Patent Application Laid-Open No. 2014-106940 (disclosed on Jun. 9 2014)

SUMMARY OF INVENTION

Technical Problem

In communication with PCIe, transfer paths are in series. Therefore, it is possible to realize high-speed communication between devices. Therefore, for example, instead of a new function mounted in a main unit controlling an industrial machine, it is conceivable that another unit (hereinafter referred to as an extension unit) having the new function be mounted and connection between the main unit and the extension unit be realized by PCIe. With such a configuration, it is possible to avoid a risk of there being an adverse influence on the control performance of the main unit due to installing the new function.

On the other hand, when an application that realizes the above-described new function is developed on the premise of connection between units by PCIe, processing capability of a prospective main unit is improved. When a traditional function and a new function are compatible in the main unit, there is a problem that it is necessary to redevelop the application.

Therefore, there is a demand for developing an application that realizes a new function on the premise that data is transferred through socket communication used in Ethernet (registered trademark) in view of versatility so that it is not necessary to redevelop an application.

An objective of an aspect of the present invention is to realize a transfer device capable of transferring data in socket communication in an upper layer of an application or the like while connecting units by PCIe.

Solution to Problem

The present invention adopts the following configuration to solve the above-described problem as an example of the present disclosure.

That is, according to an aspect of the present invention, a transfer device performs communication with a first device and a second device by PCIe. The transfer device includes: a direct memory access controller configured to control data transfer from a first memory of the first device to a second memory of the second device; a first transmission descriptor controller configured to acquire information regarding a first memory address at which transfer target data is stored in the first memory from the first device; and a first reception descriptor controller configured to acquire information regarding a second memory address at which the transfer target data is to be stored in the second memory from the second device.

According to another aspect of the present invention, an information processing device includes the transfer device as described above, the second device, and the second memory. The second device includes an application execution part that processes the transfer target data and a device driver that receives an instruction to transfer the transfer target data via a socket API from the application execution part and generates, as the information, a transmission descriptor designating a memory address of the second memory at which the transfer target data is stored.

According to still another aspect of the present invention, a data transfer method is executed by a transfer device performing communication with a first device which is a transfer source of data and a second device which is a transfer destination of the data by PCIe. The data transfer method includes: acquiring, by a transmission descriptor controller of the transfer device, first information regarding a first memory address at which transfer target data is stored in a first memory of the first device from the first device; acquiring, by a reception descriptor controller of the transfer device, second information regarding a second memory address at which the transfer target data is to be stored in a second memory of the second device from the second device; and transferring, by a direct memory access controller of the transfer device, data from the first memory to the second memory. The acquiring of the second information may be performed earlier than the acquiring of the first information.

Advantageous Effects of Invention

According to an aspect of the present invention, it is possible to obtain the advantageous effect that data can be transferred in socket communication in an upper layer of an application or the like while connecting units by PCIe.

DESCRIPTION OF EMBODIMENTS

Hereinafter, an embodiment according to an aspect of the present invention (hereinafter referred to as "present embodiments") will be described with reference to the drawings.

First Embodiment

§ 1. Application Example

Figure 1:
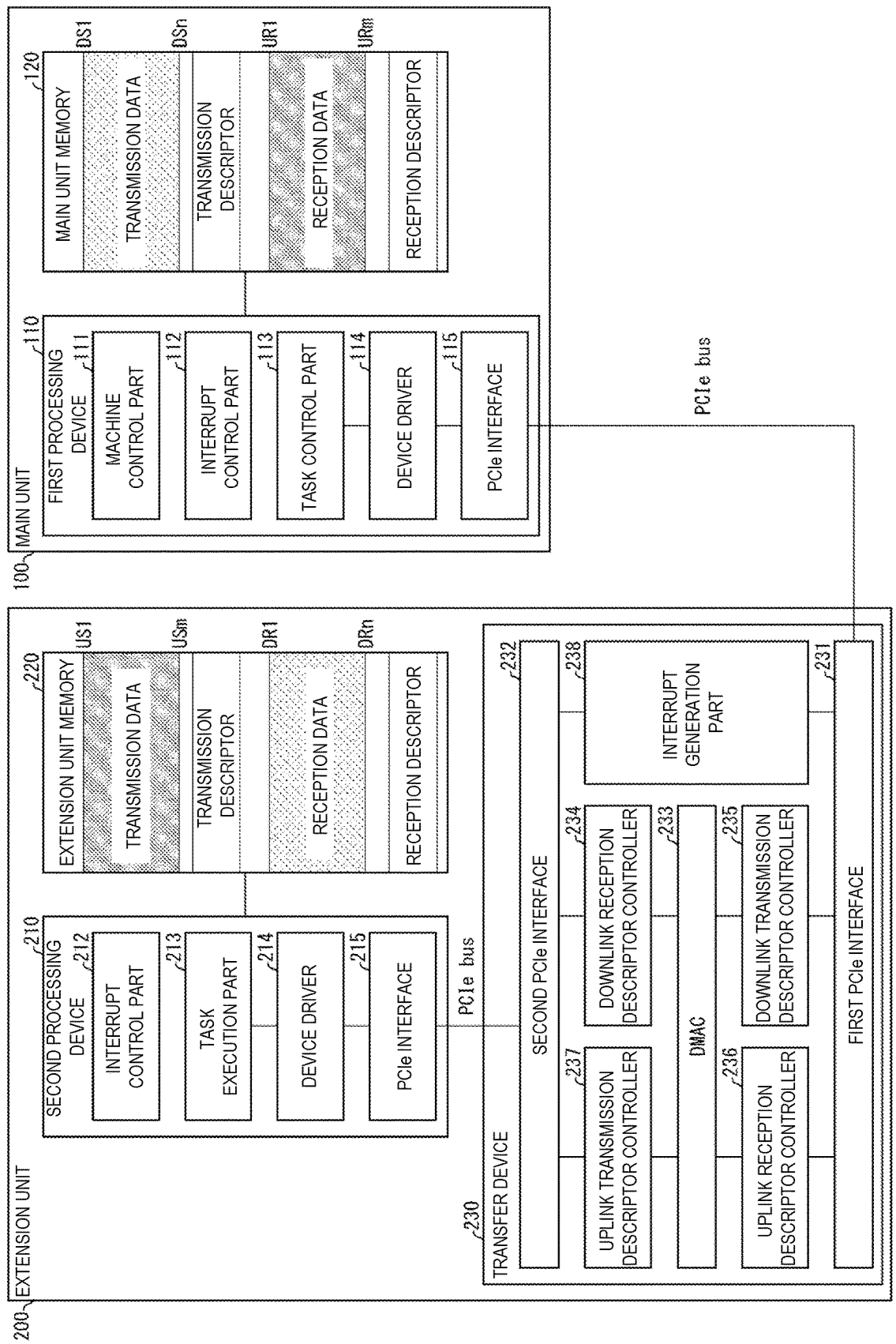
FIG. 1 is a diagram schematically exemplifying an example of a functional configuration of a first processing device, a second processing device, and a transfer device according to an embodiment.

FIG. 1 is a diagram schematically exemplifying an example of an application scenario of a transfer device 230 according to the present embodiment. The transfer device 230 is provided, for example, to realize data transfer between a first processing device 110 which is a processor of the main unit 100 and a second processing device 210 which is a processor of an extension unit 200 (an information processing device) to which a new function of the main unit 100 is externally attached, in the extension unit 200.

The transfer device 230 is connected via a bus conforming with a standard of a PCIe so as to perform communication by PCIe with each of the first processing device 110 (a first device or a second device) and the second processing device 210 (the second device or the first device). The transfer device 230 is typically configured by hardware such as a field-programmable gate array (FPGA).

The main unit 100 controls an industrial device, for example, and is typically a programmable logic controller (PLC). The first processing device 110 which is a processor of the main unit 100 is, for example, a central processing unit (CPU).

A new function taken by the extension unit 200 is not particularly limited and is assumed to be, for example, a data statistics function, a router function, or a database function. The second processing device 210 which is a processor of the extension unit 200 is typically configured by hardware such as a micro processing unit (MPU).

Hereinafter, data transfer from the first processing device 110 of the main unit 100 to the second processing device 210 of the extension unit 200 is referred to as downlink transfer, and data transfer from the second processing device 210 to the first processing device 110 is referred to as uplink transfer.

To realize downlink transfer, the transfer device 230 includes at least a direct memory access controller (DMAC) 233, a downlink transmission descriptor controller 235, and a downlink reception descriptor controller 234.

The direct memory access controller (DMAC) 233 controls data transfer from the main unit memory 120 of the first processing device 110 (the first device) to the extension unit memory 220 of the second processing device 210 (the second device).

The downlink transmission descriptor controller 235 (a transmission descriptor controller) acquires information regarding first memory addresses (for example, downlink transmission data addresses DS1 to DSn) at which transmission data (transfer target data) is stored in the main unit memory 120, for example, a transmission descriptor, from the first processing device 110.

The downlink reception descriptor controller 234 (a reception descriptor controller) acquires information regarding second memory addresses (for example, downlink reception data addresses DR1 to DRn) at which reception data (transfer target data) is to be stored in the extension unit memory 220, for example, a reception descriptor, from the second processing device 210.

To realize uplink transfer, the transfer device 230 may further include an uplink transmission descriptor controller 237 and an uplink reception descriptor controller 236.

The uplink transmission descriptor controller 237 (a transmission descriptor controller) acquires information regarding third memory addresses (for example, uplink transmission data addresses US1 to USm) at which transmission data (transfer target data) is stored in the extension unit memory 220, for example, a transmission descriptor, from the second processing device 210.

The uplink reception descriptor controller 236 (a reception descriptor controller) acquires information regarding fourth memory addresses (for example, uplink reception data addresses UR1 to URm) at which reception data (transfer target data) is to be stored in the main unit memory 120, for example, a reception descriptor, from the first processing device 110.

Thus, it is possible to realize transfer of data in socket communication in an upper layer of an application while connecting units by PCIe. Specifically, an application related to a new function is not developed on the premise of connection by PCIe, but an application can be first developed on the premise of data transfer in socket communication. Thus, in the main unit 100, control of a traditional industrial device and execution of the new function can be compatible in the future. When it is necessary to use socket communication in the application, it is possible to obtain a considerable advantageous effect of it being not necessary to redevelop the application.

§ 2. Exemplary Configuration

Hardware Configuration

FIG. 1 is a diagram schematically exemplifying an example of a hardware configuration of the main unit 100 and the extension unit 200 according to the present embodiment.

<Main Unit 100>

In the example of FIG. 1, the main unit 100 includes the first processing device 110 and the main unit memory 120 (a first memory or a second memory). The main unit 100 may further include an input device, an output device, and a nonvolatile storage device such as a read-only memory (ROM).

The first processing device 110 generally controls the main unit 100. The first processing device 110 is, for example, a CPU and controls a control target machine such as an industrial machine or equipment or controls the extension unit 200 to manages a process related to the added new function as a task.

The main unit memory 120 is a volatile random access memory (RAM). The main unit memory 120 stores transmission data which is generated by the first processing device 110, reception data which is generated by the second processing device 210 and is to be processed by the first processing device 110, and various programs which are to be executed by the first processing device 110. The main unit memory 120 may be used as a working memory when various programs are executed by the first processing device 110. As the main unit memory 120, a dynamic random access memory (DRAM) or the like can be typically used.

<Extension Unit 200>

In the example of FIG. 1, the extension unit 200 includes the second processing device 210, the extension unit memory 220 (the second memory or the first memory), and the transfer device 230.

The second processing device 210 generally controls the extension unit 200. The second processing device 210 is, for example, an MPU and executes a process related to the added new function as a task based on the data generated by the first processing device 110.

The extension unit memory 220 is a volatile storage area (RAM). The extension unit memory 220 stores transmission data which is generated by the second processing device 210, reception data which is generated by the first processing device 110 and is to be processed by the second processing device 210, and various programs which are to be executed by the second processing device 210. The extension unit memory 220 may be used as a working memory when various programs are executed by the second processing device 210. As the extension unit memory 220, a DRAM or the like can be typically used.

The transfer device 230 performs communication with the first processing device 110 and the second processing device 210 by PCIe and controls downlink transmission between the first processing device 110 and the second processing device 210 and uplink transmission, as necessary. The transfer device 230 is typically, an FPGA, as described above.

Functional Configuration

FIG. 1 is a diagram schematically exemplifying an example of a functional configuration of the first processing device 110, the second processing device 210, and the transfer device 230 according to the present embodiment.
First Processing Device 110

The first processing device 110 loads a control program of the main unit 100 stored in a nonvolatile storage device (not illustrated) to the main unit memory 120. The first processing device 110 interprets and executes the control program loaded into the main unit memory 120 to control each constituent element. Thus, as illustrated in FIG. 1, the first processing device 110 according to the embodiment includes a machine control part 111, an interrupt control part 112, a task control part 113, a device driver 114, and a PCIe interface 115.

The machine control part 111 controls an industrial device connected to the main unit 100. The industrial device is assumed to be, for example, a manufacturing device disposed in a manufacturing process or a sensing device that senses the manufacturing device or a working state. The industrial device is controlled by the machine control part 111 to realize factory automation (FA).

The machine control part 111 communicates with each industrial device at a fixed period to acquire data processed in a process located downstream from each industrial device. For example, the acquired data may be processed by the extension unit 200.

The interrupt control part 112 causes the first processing device 110 to generate an interrupt by writing a value at a specific address via PCIe. A scheme of generating an interrupt by writing the value at the specific address is referred to as a message signal interrupt (MSI) and writing of the value at the specific address for interrupt is referred to as issuing of an MSI. For example, the interrupt control part 112 causes the first processing device 110 to generate an interrupt by issuing an MSI from the interrupt generation part 238 via PCIe and causes the first processing device 110 to recognize completion of the transmission of the data.

The task control part 113 manages a process which is to be processed on data accumulated in an FA system governed by the main unit 100 as a task. The task control part 113 allocates the task to the extension unit 200 in the vicinity of a task executer. Specifically, the task control part 113 controls which data is transferred to which extension unit 200.

For example, a server-client system in which the main unit 100 is an FTP server and the extension unit 200 is an FTP client in conformity with a file transfer protocol (FTP) may be constructed. In this case, the task control part 113 establishes connection with the task execution part 213 of the extension unit 200 in response to a connection request from the task execution part 213, and transfers data necessary to execute a task to the task execution part 213 or receives data processed by the task execution part 213.

The device driver 114 enables the first processing device 110 of the main unit 100 to transfer data to the second processing device 210 of the extension unit 200 via the transfer device 230 by writing descriptors on the main unit memory 120. For example, the device driver 114 receives an instruction to transfer data from the task control part 113 via a socket application program interface (API). The device driver 114 writes descriptors necessary to transfer data to the extension unit 200 on the main unit memory 120.

Of the descriptors written on the main unit memory 120, a transmission descriptor defines a part of an operation performed for the DMA 233 to realize downlink transfer. Thus, the task control part 113 of the first processing device 110 can transmit data to the task execution part 213 of the second processing device 210. A reception descriptor defines a part of an operation performed for the DMAC 233 to realize uplink transfer. Thus, the task control part 113 of the first processing device 110 can receive data transmitted from the task execution part 213 of the second processing device 210.

More specifically, the descriptors configure a list of DMA commands used for the DMAC 233 to perform a direct memory access (DMA) operation. For example, the list of the DMA commands is configured as a chain of the descriptors. Each descriptor has a pointer to a subsequent descriptor to be processed and the final descriptor has a pointer to the first descriptor of the chain. The DMAC 233 can operate in sequence in accordance with each descriptor to realize a series of data transfer. The transmission descriptor includes, for example, a location at which transfer target data to be transferred to another memory (an address of the memory) is stored, a data length, and a transfer completion flag set up when the transfer is completed without error. The reception descriptor includes, for example, a location at which transfer target data transferred from another memory is stored (an address of the memory) and a transfer completion flag set up when the transfer is completed without accident.

The PCIe interface 115 is an interface for connecting the first processing device 110 to the transfer device 230 via a PCIe bus by PCIe.
<Second Processing Device 210>

The second processing device 210 loads a control program of the extension unit 200 stored in a nonvolatile storage device (not illustrated) into the extension unit memory 220. The second processing device 210 interprets and executes the control program loaded into the extension unit memory 220 to control each constituent element. Thus, as illustrated in FIG. 1, the second processing device 210 according to the present embodiment includes an interrupt control part 212, a task execution part 213 (an application execution part), a device driver 214, and a PCIe interface 215.

The interrupt control part 212 causes the second processing device 210 to generate an interrupt by writing a value at a specific address via PCIe. For example, the interrupt control part 212 causes the second processing device 210 to generate an interrupt by issuing an MSI from the interrupt generation part 238 via PCIe and causes the second processing device 210 to recognize completion of the transmission of the data.

The task execution part 213 performs an added new function as a task managed by the task control part 113. The task execution part 213 is typically realized as an application. For example, the task execution part 213 is configured to perform socket communication with the task control part 113 and performs a task by receiving data generated by the task control part 113 through the socket communication and processing the data in accordance with a predetermined program. The task execution part 213 returns data as a processing result to the task control part 113 through the socket communication.

For example, when a server-client system in which the main unit 100 is an FTP server and the extension unit 200 is an FTP client in conformity with the FTP is constructed, the task execution part 213 establishes connection with the task control part 113 by making a connection request to the main unit 100 and downloads or uploads data in conformity with the FTP.

The device driver 214 enables the second processing device 210 of the extension unit 200 to transfer data to the first processing device 110 of the main unit 100 via the transfer device 230 by writing the descriptor on the extension unit memory 220. For example, the device driver 214 receives an instruction to transfer data from the task execution part 213 via a socket API. The device driver 214 writes the descriptor necessary to transfer data to the main unit 100 on the extension unit memory 220.

Of the descriptors written on the extension unit memory 220, a transmission descriptor defines a part of an operation performed for the DMA 233 to realize uplink transfer. Thus, the task execution part 213 of the second processing device 210 can transmit data to the task control part 113 of the first processing device 110. A reception descriptor defines a part of an operation performed for the DMAC 233 to realize downlink transfer. Thus, the task execution part 213 of the second processing device 210 can receive data transmitted from the task control part 113 of the first processing device 110.

The PCIe interface 215 is an interface for connecting the second processing device 210 to the transfer device 230 via a PCIe bus by PCIe.

<Transfer Device 230>

The transfer device 230 directly controls the data transfer between the main unit 100 and the extension unit 200 independently from the first processing device 110 and the second processing device 210 in accordance with the descriptor loaded into the main unit memory 120 or the extension unit memory 220. Therefore, the transfer device 230 includes a first PCIe interface 231, a second PCIe interface 232, a DMAC 233, a downlink reception descriptor controller 234, a downlink transmission descriptor controller 235, an uplink reception descriptor controller 236, an uplink transmission descriptor controller 237, and an interrupt generation part 238 as constituent elements.

The first PCIe interface 231 is an interface for connecting the transfer device 230 to the first processing device 110 via PCIe bus by PCIe.

The second PCIe interface 232 is an interface for connecting the transfer device 230 to the second processing device 210 via PCIe bus by PCIe.

The DMAC 233 interprets the descriptor loaded into the main unit memory 120 or the extension unit memory 220 and directly performs reading and writing of the data from and on the main unit memory 120 and the extension unit memory 220 in accordance with the content.

The downlink reception descriptor controller 234 directly acquires the reception descriptors necessary for the second processing device 210 to receive the transfer target data transmitted from the first processing device 110 in downlink transfer from the extension unit memory 220. For example, the downlink reception descriptor controller 234 fetches the reception descriptors written on the extension unit memory 220 in sequence in accordance with the pointers set in internal registers (not illustrated) and delivers the reception descriptors to the DMAC 233.

The downlink transmission descriptor controller 235 directly acquires the transmission descriptors necessary for the first processing device 110 to transmit the transfer target data destined for the second processing device 210 in the downlink transfer from the main unit memory 120. For example, the downlink transmission descriptor controller 235 fetches the transmission descriptors written on the first unit memory 120 in sequence in accordance with the pointers set in internal resisters (not illustrated) and delivers the transmission descriptors to the DMAC 233.

The uplink reception descriptor controller 236 directly acquires the reception descriptors necessary for the first processing device 110 to receive the transfer target data transmitted from the second processing device 210 in uplink transfer from the main unit memory 120. For example, the uplink reception descriptor controller 236 fetches the reception descriptors written on the main unit memory 120 in sequence in accordance with the pointers set in internal resisters (not illustrated) and delivers the reception descriptors to the DMAC 233.

The uplink transmission descriptor controller 237 directly acquires the transmission descriptors necessary for the second processing device 210 to transmit the transfer target data destined for the first processing device 110 in uplink transfer from the extension unit memory 220. For example, the uplink transmission descriptor controller 237 fetches the transmission descriptors written on the extension unit memory 220 in sequence in accordance with the pointers set in internal resisters (not illustrated) and delivers the transmission descriptors to the DMAC 233.

The interrupt generation part 238 causes the first processing device 110 or the second processing device 210 to generate an interrupt (for example, an MSI) via PCIe. The interrupt generation part 238 may include a first interrupt generation part that causes the first processing device 110 to generate an interrupt and a second interrupt generation part that causes the second processing device 210 to generate an interrupt.

§ 3. Exemplary Operation

Next, exemplary operations of the main unit 100 and the extension unit 200 will be described with reference to FIGS. 2 and 3.

Downlink Transfer

Figure 2:
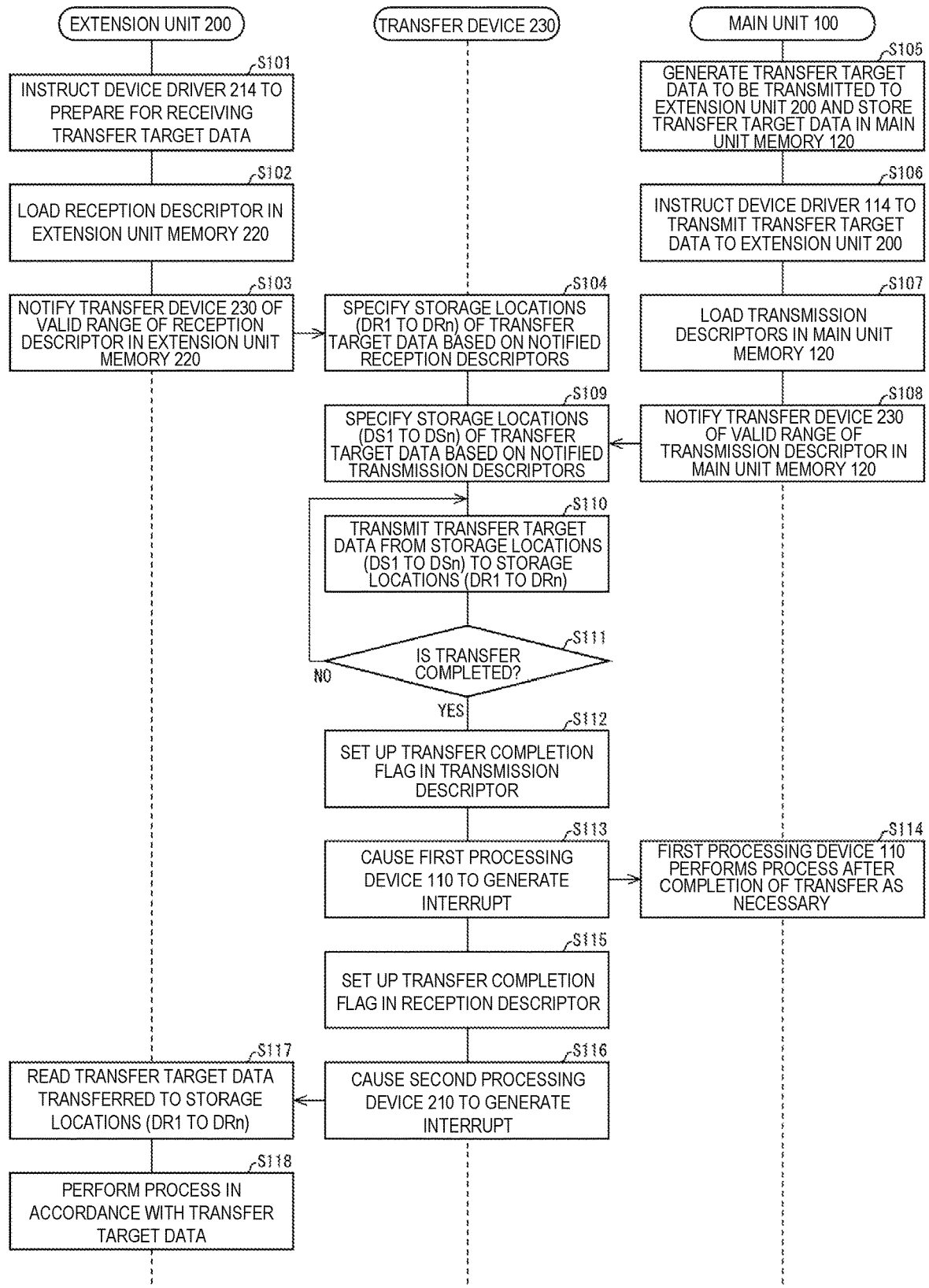
FIG. 2 is a flowchart illustrating an example of a processing procedure of downlink transfer.

FIG. 2 is a flowchart exemplifying an example of a processing procedure of downlink transfer from the main unit 100 to the extension unit 200. The processing procedure to be described below is merely exemplary and each processing may be changed as much as possible. In the processing order to be described below, steps can be appropriately omitted, replaced, and added according to an embodiment.

In step S101, the task execution part 213 of the second processing device 210 in the extension unit 200 instructs the device driver 214 to prepare for receiving the transfer target data transmitted from the main unit 100 via the socket API.

In step S102, the device driver 214 loads the reception descriptor necessary to receive the above-described transfer target data in the extension unit memory 220.

In step S103, the device driver 214 notifies the downlink reception descriptor controller 234 of information (for example, address information, a pointer, or the like) indicating a valid range of the reception descriptor in the extension unit memory 220. The notification method is not particularly limited. For example, the information may be notified of by writing a valid pointer on a trail resister (not illustrated) of the downlink reception descriptor controller 234. Alternatively, the reception descriptors themselves may be directly supplied from the device driver 214 to the downlink reception descriptor controller 234.

In step S104, the downlink reception descriptor controller 234 acquires the reception descriptors. The DMAC 233 interprets the reception descriptor acquired by the downlink reception descriptor controller 234 and specifies downlink reception data addresses (the second memory addresses or the fourth memory addresses) indicating storage locations in the extension unit memory 220 in the transfer target data transmitted from the main unit 100. Specifically, the DMAC 233 specifies locations at which the transfer target data is to be stored based on the downlink reception data addresses which are acquired by the downlink reception descriptor controller 234 and at which the transfer target data is to be stored based on, for example, the reception descriptors (second information) indicating DR1 to DRn.

In step S105, the task control part 113 of the first processing device 110 in the main unit 100 generates the transfer target data to be transmitted to the extension unit 200 and stores the transfer target data in the main unit memory 120.

In step S106, the task control part 113 instructs the device driver 114 to transmit the stored transfer target data to the extension unit 200 via the socket API.

In step S107, the device driver 114 loads the transmission descriptors necessary to transmit the transfer target data to the extension unit 200 in the main unit memory 120.

In step S108, the device driver 114 notifies the downlink transmission descriptor controller 235 of the information (for example, an address information or a point) indicating the valid range of the transmission descriptor in the main unit memory 120. The notification method is not particularly limited. For example, the information may be notified of by writing a valid pointer on a trail resister (not illustrated) of the downlink transmission descriptor controller 235. Alternatively, the transmission descriptors themselves may be directly supplied from the device driver 114 to the downlink transmission descriptor controller 235.

In step S109, the downlink transmission descriptor controller 235 acquires the transmission descriptors. The DMAC 233 interprets the transmission descriptor acquired by the downlink transmission descriptor controller 235 and specifies downlink transmission data addresses (the first memory addresses or the third memory addresses) indicating storage locations in the main unit memory 120 in the transfer target data transmitted from the extension unit 200. Specifically, the DMAC 233 specifies locations at which the transfer target data is stored based on the downlink transmission data addresses which are acquired by the downlink transmission descriptor controller 235 and at which the transfer target data to be transmitted is stored based on, for example, the transmission descriptors (first information) indicating DS1 to DSn. Step S109 may be performed earlier than step S104.

In step S110, the DMAC 233 writes the transfer target data read from the storage locations (DS1 to DSn) in the main unit memory 120 on the storage locations (DR1 to DRn) in the extension unit memory 220 and performs data transfer. When the reading and writing of all the transfer target data are completed (Yes in S111), the transfer device 230 causes the process to proceed to step S112.

In step S112, the downlink transmission descriptor controller 235 sets up the transfer completion flag indicating completion of the data transfer at a predetermined location in the valid range of the transmission descriptors on the main unit memory 120.

In step S113, the interrupt generation part 238 notifies the first processing device 110 of the completion of the data transfer. Specifically, the interrupt generation part 238 issues the MSI by writing predetermined data at a predetermined address via PCIe and causes the first processing device 110 to generate an interrupt.

In step S114, the interrupt control part 112 of the first processing device 110 cause the interrupt to be generated based on the issuing of the MSI and causes the first processing device 110 to recognize the completion of the data transfer. The first processing device 110 may perform a process to be performed after the completion of the transfer as necessary.

In step S115, the downlink reception descriptor controller 234 of the transfer device 230 sets up the transfer completion flag at a predetermined location in the valid range of the reception descriptor on the extension unit memory 220.

In step S116, the interrupt generation part 238 notifies the second processing device 210 of completion of the data transfer. Specifically, the interrupt generation part 238 issues the MSI by writing predetermine data at a predetermined address via PCIe and causes the second processing device 210 to generate an interrupt.

In step S117, the interrupt control part 212 of the extension unit 200 causes an interrupt to be generated based on the issuing of the MSI and causes the second processing device 210 to recognize completion of the data transfer. When the second processing device 210 recognizes the completion of the data transfer, the device driver 214 notifies the task execution part 213 of storage locations (for example, DR1 to DRn) on the extension unit memory 220 as storage locations of the transfer target data via the socket API. The task execution part 213 reads the transfer target data from the storage locations (for example, DR1 to DRn) on the extension unit memory 220.

In step S118, the task execution part 213 performs a process in accordance with the transfer target data read from the extension unit memory 220.

Uplink Transmission

Figure 3:
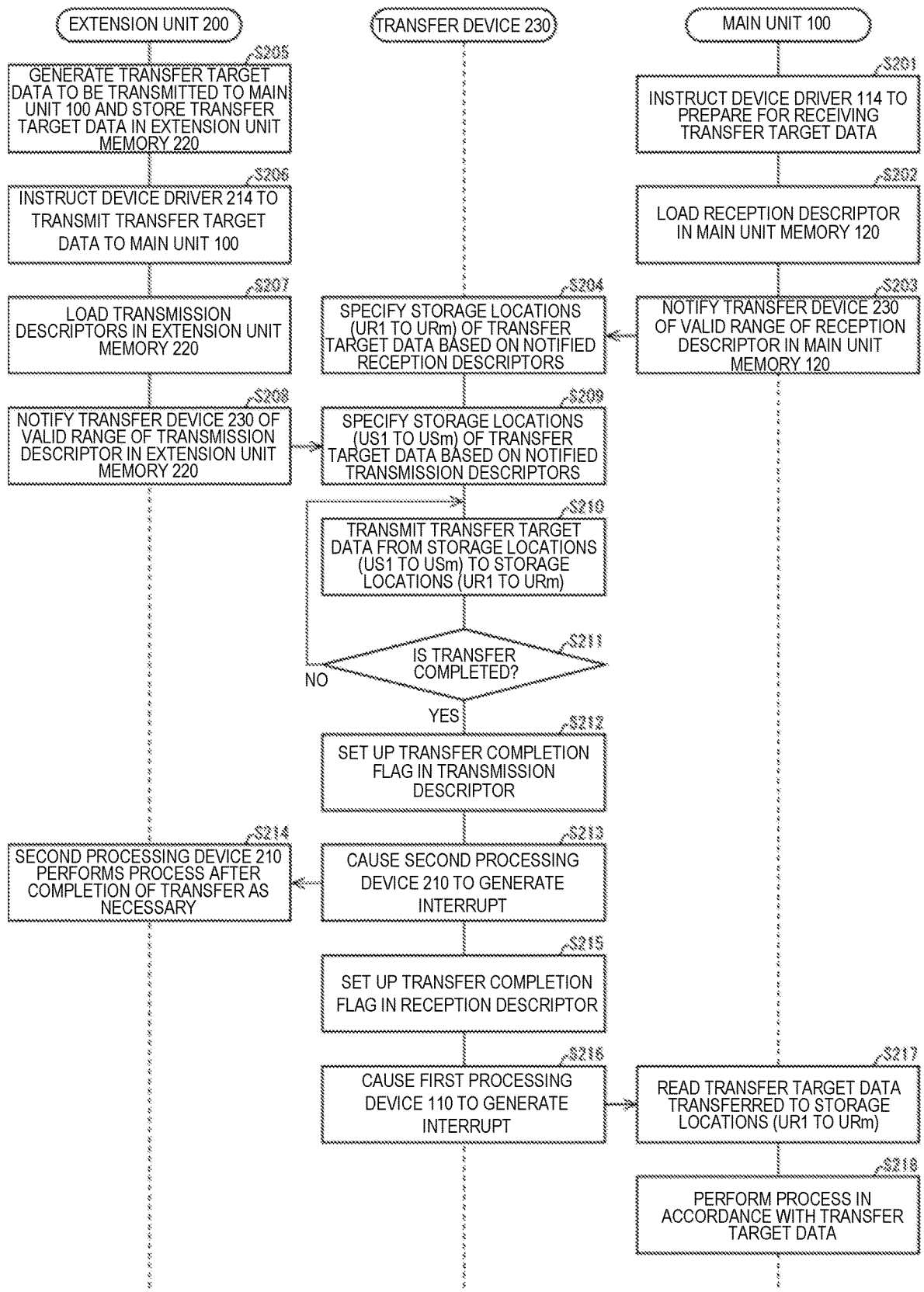
FIG. 3 is a flowchart illustrating an example of a processing procedure of uplink transfer.

FIG. 3 is a flowchart exemplifying an example of a processing procedure of uplink transfer from the extension unit 200 to the main unit 100. The processing procedure to be described below is merely exemplary and each processing may be changed as much as possible. In the processing order to be described below, steps can be appropriately omitted, replaced, and added according to an embodiment.

In step S201, the task control part 113 of the first processing device 110 in the main unit 100 instructs the device driver 114 to prepare for receiving the transfer target data transmitted from the extension unit 200 via the socket API.

In step S202, the device driver 114 loads the reception descriptor necessary to receive the above-described transfer target data in the main unit memory 120.

In step S203, the device driver 114 notifies the uplink reception descriptor controller 236 of information (for example, address information, a pointer, or the like) indicating a valid range of the reception descriptor in the main unit memory 120. The notification method is not particularly limited. For example, the information may be notified of by writing a valid pointer on a trail resister (not illustrated) of the uplink reception descriptor controller 236. Alternatively, the reception descriptors themselves may be directly supplied from the device driver 114 to the uplink reception descriptor controller 236.

In step S204, the uplink reception descriptor controller 236 acquires the reception descriptors. The DMAC 233 interprets the reception descriptor acquired by the uplink reception descriptor controller 236 and ascertains uplink reception data addresses (the fourth memory addresses or the second memory addresses) indicating storage locations in the main unit memory 120 in the transfer target data transmitted from the extension unit 200. Specifically, the DMAC 233 specifies locations at which the transfer target data is to be stored based on the uplink reception data addresses which are acquired by the uplink reception descriptor controller 236 and at which the transfer target data is to be stored based on, for example, the reception descriptors (second information) indicating UR1 to URm.

In step S205, the task execution part 213 of the second processing device 210 in the extension unit 200 generates the transfer target data to be transmitted to the main unit 100 and stores the transfer target data in the extension unit memory 220.

In step S206, the task execution part 213 instructs the device driver 214 to transmit the stored transfer target data to the main unit 100 via the socket API.

In step S207, the device driver 214 loads the transmission descriptors necessary to transmit the transfer target data to the main unit 100 in the extension unit memory 220.

In step S208, the device driver 214 notifies the uplink transmission descriptor controller 237 of the information (for example, an address information or a point) indicating the valid range of the transmission descriptor in the extension unit memory 220. The notification method is not particularly limited. For example, the information may be notified of by writing a valid pointer on a trail resister (not illustrated) of the uplink transmission descriptor controller 237. Alternatively, the transmission descriptors themselves may be directly supplied from the device driver 214 to the uplink transmission descriptor controller 237.

In step S209, the uplink transmission descriptor controller 237 acquires the transmission descriptors. The DMAC 233 interprets the transmission descriptor acquired by the uplink transmission descriptor controller 237 and ascertains uplink transmission data addresses (the third memory addresses or the first memory addresses) indicating storage locations in the extension unit memory 220 in the transfer target data transmitted from the main unit 100. Specifically, the DMAC 233 specifies locations at which the transfer target data to be transmitted is stored based on the uplink transmission data addresses which are acquired by the uplink transmission descriptor controller 237 and at which the transfer target data to be transmitted is stored based on, for example, the transmission descriptors (first information) indicating US1 to USm. Step S209 may be performed earlier than step S204.

In step S210, the DMAC 233 writes the transfer target data read from the storage locations (US1 to USm) in the extension unit memory 220 on the storage locations (UR1 to URm) in the main unit memory 120 and performs data transfer. When the reading and writing of all the transfer target data are completed (Yes in S211), the transfer device 230 causes the process to proceed to step S212.

In step S212, the uplink transmission descriptor controller 237 sets up the transfer completion flag indicating completion of the data transfer at a predetermined location in the valid range of the transmission descriptors on the extension unit memory 220.

In step S213, the interrupt generation part 238 notifies the second processing device 210 of the completion of the data transfer. Specifically, the interrupt generation part 238 issues the MSI by writing predetermined data at a predetermined address via PCIe and causes the second processing device 210 to generate an interrupt.

In step S214, the interrupt control part 212 of the second processing device 210 causes the interrupt to be generated based on the issuing of the MSI and causes the second processing device 210 to recognize the completion of the data transfer. The second processing device 210 may perform a process to be performed after the completion of the transfer as necessary.

In step S215, the uplink reception descriptor controller 236 of the transfer device 230 sets up the transfer completion flag at a predetermined location in the valid range of the reception descriptor on the main unit memory 120.

In step S216, the interrupt generation part 238 notifies the first processing device 110 of completion of the data transfer. Specifically, the interrupt generation part 238 issues the MSI by writing predetermine data at a predetermined address via PCIe and causes the first processing device 110 to generate an interrupt.

In step S217, the interrupt control part 112 of the main unit 100 causes an interrupt to be generated based on the issuing of the MSI and causes the first processing device 110 to recognize completion of the data transfer. When the first processing device 110 recognizes the completion of the data transfer, the device driver 114 notifies the task control part 113 of storage locations (UR1 to URm) on the main unit memory 120 as storage locations of the transfer target data via the socket API. The task control part 113 reads the transfer target data from the storage locations (UR1 to URm) on the main unit memory 120.

In step S218, the task control part 113 performs a process in accordance with the transfer target data read from the main unit memory 120.

Operational Effect

As described above, according to the present embodiment, even when the first processing device 110 and the second processing device 210 are connected by PCIe, the first processing device 110 and the second processing device 210 can transmit and receive data through socket communication in an upper layer of an application or the like.

At present, there is a demand for desiring to additionally mount an application related to a new function (a router function, a database function, or the like) on the main unit 100 such as a PLC controlling an industrial device. It is desirable to additionally mount an application on the extension unit 200 which is a different unit from the main unit 100 in consideration of an influence on control performance of the main unit 100. In this case, to realize high-speed communication between the main unit 100 and the extension unit 200, it is desirable to connect both the units by PCIe.

However, in the future, when CPU performance of the main unit 100 is improved and it is not necessary to consider the influence on the control performance, it is expected that a need for operating an additional application on the single main unit 100 is created on the single main unit 100 using a virtualization technology such as a hypervisor. At this time, when the additional application is developed on the premise of connection by PCIe, a problem arises in that the application has to be redeveloped so that the application is executed again by the single main unit 100.

According to an aspect of the present disclosure, in an additional application (for example, the task control part 113 and the task execution part 213), communication is performed in a socket so that the socket is converted into a descriptor by the device drivers (the device drivers 114 and 214). Then, the DMAC 233 of the transfer device 230 is caused to perform transfer before transfer of a packet in accordance with the descriptor and load packets in the device driver of a transfer destination. More specifically, the transfer device 230 includes the reception descriptor controller that acquires the reception descriptor of the transfer destination and the transmission descriptor controller that acquires the transmission descriptor of the transfer source in addition to the DMAC 233. Thus, the units are connected by PCIe and socket communication is possible in applications of an upper layer.

Thus, the upper layer, that is, the additional applications (for example, the task control part 113 and the task execution part 213) can be developed in advance so that socket communication used in an Ethernet is possible in terms of versatility. As a result, when an embodiment in which an additional function is performed in the single main unit 100 can be implemented in the future, the embodiment can be implemented although the application is not redeveloped.

That is, a user interface of an application is not changed in the future. Thus, for example, an application developer can develop an application by the same coding without being conscious of whether the application under development is executed by a unit different from the main unit 100 as the extension unit 200 or by the single main unit 100 in an environment virtualized by a hypervisor or the like.

In a present state, since the main unit 100 and the extension unit 200 are connected by PCIe, a mutual interrupt can be generated other than socket communication. As described above, according to an aspect of the present disclosure, appropriate use can be realized in particular in a product in which it is desirable to connect the units by PCIe.

§ 4. Modified Examples

The embodiments of the present invention have been described above, but the above description is merely an example of the present invention in all senses. It is needless to say that various improvements or modifications can be made without departing from the scope of the present invention. For example, the following changes can be made. Hereinafter, the same reference numerals are given to constituent elements similar to those of the above embodiments and description of points similar to those of the above description will be appropriately omitted. The following modified examples can be appropriately combined.

<4.1>

Figure 4:
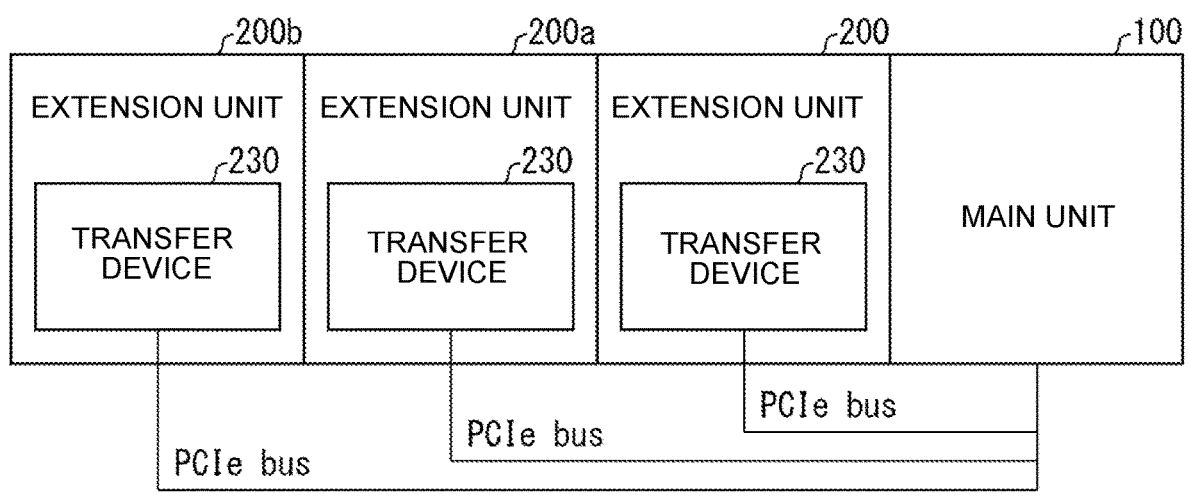
FIG. 4 is a diagram illustrating another exemplary connection between a main unit and an extension unit.

FIG. 4 is a diagram illustrating another exemplary connection between the main unit 100 and the extension unit 200. As illustrated in FIG. 4, the plurality of extension units 200 executing a plurality of other applications can be connected to the single main unit 100.

Each of the extension units 200, 200a, and 200b, and the like includes the transfer device 230 that has the above-described configuration. Each extension unit 200 can perform data transfer with the main unit 100 via the transfer device 230 included in each extension unit 200. In an upper layer of the first processing device 110 of the main unit 100, it is not necessary to be conscious of one-to-many PCIe connection because of a plurality of connections by an Ethernet.

Conclusion

In the present invention, the following configuration is adopted to solve the above-described problem as an example of the present disclosure.

That is, according to an aspect of the present invention, a transfer device performs communication with a first device and a second device by PCIe. The transfer device includes: a direct memory access controller configured to control data transfer from a first memory of the first device to a second memory of the second device; a first transmission descriptor controller configured to acquire information regarding a first memory address at which transfer target data is stored in the first memory from the first device; and a first reception descriptor controller configured to acquire information regarding a second memory address at which the transfer target data is to be stored in the second memory from the second device.

With the foregoing configuration, it is possible to obtain the advantageous effect that the data can be transferred in the socket communication in an upper layer such as an application while connecting the units by PCIe.

The transfer device according to the aspect may further include an interrupt generation part configured to generate an interrupt and notify the first device or the second device of transfer completion when transfer of the transfer target data is completed. Thus, the first device or the second device can be caused to be conscious of the completion of the data transfer timely.

The transfer device according to the aspect may further include a second transmission descriptor controller configured to acquire information regarding a third memory address at which transfer target data is stored in the second memory from the second device; and a second reception descriptor controller configured to acquire information regarding a fourth memory address at which the transfer target data is to be stored in the first memory from the first device. The direct memory access controller may control data transfer from the second memory of the second device to the first memory of the first device. Thus, in addition to the data transfer from the first memory to the second memory, the data transfer from the second memory to the first memory can be performed in the socket communication.

According to another aspect of the present invention, an information processing device includes any of the transfer device as described above, the second device, and the second memory. The second device includes an application execution part that processes the transfer target data and a device driver that receives an instruction to transfer the transfer target data via a socket API from the application execution part and generates, as the information, a transmission descriptor designating a memory address of the second memory at which the transfer target data is stored.

With the foregoing configuration, it is possible to obtain the advantageous effect that the data can be transferred in the socket communication in an upper layer such as an application while connecting the units by PCIe.

In the transfer device according to the aspect, the device driver of the second device may store the transmission descriptor in the second memory. The direct memory access controller of the transfer device may specify a location at which the transfer target data is stored in the second memory based on the transmission descriptor acquired from the second memory by the second transmission descriptor controller. Thus, the direct memory access controller can correctly read the transfer target data to be transferred from the second memory.

In the transfer device according to the aspect, the direct memory access controller of the transfer device may specify a location at which the transfer target data is stored in the second memory based on the transmission descriptor acquired from the device driver by the second transmission descriptor controller. Thus, the direct memory access controller can correctly read the transfer target data to be transferred from the second memory.

According to still another aspect of the present invention, a data transfer method is executed by a transfer device performing communication with a first device which is a transfer source of data and a second device which is a transfer destination of the data by PCIe. The data transfer method includes: acquiring, by a transmission descriptor controller of the transfer device, first information regarding a first memory address at which transfer target data is stored in a first memory of the first device from the first device; acquiring, by a reception descriptor controller of the transfer device, second information regarding a second memory address at which the transfer target data is to be stored in a second memory of the second device from the second device; and transferring, by a direct memory access controller of the transfer device, data from the first memory to the second memory. The acquiring of the second information may be performed earlier than the acquiring of the first information.

With the foregoing configuration, it is possible to obtain the advantageous effect that the data can be transferred in the socket communication in an upper layer such as an application while connecting the units by PCIe.

Realization Example by Software

The control block (in particular, the first PCIe interface 231, the second PCIe interface 232, the DMAC 233, the downlink reception descriptor controller 234, the downlink transmission descriptor controller 235, the uplink reception descriptor controller 236, the uplink transmission descriptor controller 237, and the interrupt generation part 238) of the transfer device 230 may be realized by a logical circuit (hardware) formed in an integrated circuit (IC chip) or the like or may be realized by software.

In the latter case, the transfer device 230 includes a computer that executes a command of a program which is software realizing each function. The computer includes, for example, one or more processors and a computer-readable recording medium that stores the program. In the computer, when the processor reads the program from the recording medium and executes the program, the objective of the present invention is attained. As the processor, for example, a central processing unit (CPU) can be used. As the recording medium, in addition to a "non-transitory type of medium," for example, a read-only memory (ROM), a tape, a disc, a card, a semiconductor memory, a programmable logical circuit, or the like can be used. A random access memory (RAM) in which the program is loaded may be further included. The program may be supplied to the computer via any transfer medium (a communication network, broadcast waves, or the like) capable of transferring the program. An aspect of the present invention can be realized in a form of a data signal in which the program is implemented by electronic transfer and which is embedded in carrier waves.

The present invention is not limited to the above-described embodiments. Various changes can be made within the scope of the claims and embodiments obtained by combining the technical means disclosed in different embodiments are also included in the technical scope of the present invention.

The invention claimed is:

1. A transfer device performing communication with a first device and a second device by PCIe, the transfer device comprising:
   a direct memory access controller configured to control data transfer from a first memory of the first device to a second memory of the second device;
   a first transmission descriptor controller configured to acquire information regarding a first memory address at which transfer target data is stored in the first memory from the first device; and
   a first reception descriptor controller configured to acquire information regarding a second memory address at which the transfer target data is to be stored in the second memory from the second device,
   wherein the second device receives an instruction to transfer the transfer target data via a socket API and generates, as the information, a transmission descriptor designating a memory address of the second memory at which the transfer data is stored.

2. The transfer device according to claim 1, further comprising:
   an interrupt generation part configured to generate an interrupt and notify the first device or the second device of transfer completion when transfer of the transfer target data is completed.

3. The transfer device according to claim 2, further comprising:
   a second transmission descriptor controller configured to acquire information regarding a third memory address at which transfer target data is stored in the second memory from the second device; and
   a second reception descriptor controller configured to acquire information regarding a fourth memory address at which the transfer target data is to be stored in the first memory from the first device,
   wherein the direct memory access controller controls data transfer from the second memory of the second device to the first memory of the first device.

4. The transfer device according to claim 1, further comprising:
   a second transmission descriptor controller configured to acquire information regarding a third memory address at which transfer target data is stored in the second memory from the second device; and
   a second reception descriptor controller configured to acquire information regarding a fourth memory address at which the transfer target data is to be stored in the first memory from the first device, wherein the direct memory access controller controls data transfer from the second memory of the second device to the first memory of the first device.

5. An information processing device comprising:
a transfer device performing communication with a first device and a second device by PCIe and comprising:
   a direct memory across controller configured to control data transfer from a first memory of the first device to a second memory of the second device; a first transmission descriptor controller configured to acquire information regarding a first memory address at which transfer target data is stored in the first memory from the first device;
   a first reception descriptor controller configured to acquire information regarding a second memory address at which the transfer target data is to be stored in the second memory from the second device;
   a second transmission descriptor controlled configured to acquire information regarding a third memory address at which transfer data is stored in the second memory from the second device; and
   a second reception descriptor controller configured to acquire information regarding a fourth memory address at which the transfer target is to be stored in the first memory from the first device,
   wherein the direct memory access controller controls data transfer from the second memory of the second device to the first memory of the first device, and
the second device comprising:
   an application execution part that processes the transfer target data, and
   a device driver that receives an instruction to transfer the transfer target data via a socket API from the application execution part and generates, as the information, a transmission descriptor designating a memory address of the second memory at which the transfer target data is stored.

6. The information processing device according to claim 5,
   wherein the device driver of the second device stores the transmission descriptor in the second memory, and
   wherein the direct memory access controller of the transfer device specifies a location at which the transfer target data is stored in the second memory based on the transmission descriptor acquired from the second memory by the second transmission descriptor controller.

7. The information processing device according to claim 5, wherein the direct memory access controller of the transfer device specifies a location at which the transfer target data is stored in the second memory based on the transmission descriptor acquired from the device driver by the second transmission descriptor controller.

8. A data transfer method executed by a transfer device performing communication with a first device which is a transfer source of data and a second device which is a transfer destination of the data by PCIe, the method comprising:
   acquiring, by a transmission descriptor controller of the transfer device, first information regarding a first memory address at which transfer target data is stored in a first memory of the first device from the first device;
   acquiring, by a reception descriptor controller of the transfer device, second information regarding a second memory address at which the transfer target data is to be stored in a second memory of the second device from the second device; and
   transferring, by a direct memory access controller of the transfer device, data from the first memory to the second memory,
   wherein the second device receives an instruction to transfer the transfer target data via a socket API and generates, as the information, a transmission descriptor designating a memory address of the second memory at which the transfer target data is stored.

* * * * *